United States Patent
Jiao et al.

(10) Patent No.: US 9,591,230 B2
(45) Date of Patent: Mar. 7, 2017

(54) SYSTEMS AND METHODS FOR REDUCED IMAGE FLICKER

(75) Inventors: Hongguang Jiao, Shanghai (CN);
Robert S. Gao, Syosset, NY (US);
Kevin Liu, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1481 days.

(21) Appl. No.: 12/645,916

(22) Filed: Dec. 23, 2009

(65) Prior Publication Data

US 2011/0149149 A1    Jun. 23, 2011

(51) Int. Cl.
*H04N 5/235* (2006.01)

(52) U.S. Cl.
CPC ......... *H04N 5/2351* (2013.01); *H04N 5/2357* (2013.01)

(58) Field of Classification Search
CPC ........................... H04N 5/2351; H04N 5/2357
USPC .................... 348/226.1, 227.1, 228.1, 447
See application file for complete search history.

(56) References Cited

U.S. PATENT DOCUMENTS

| | | | |
|---|---|---|---|
| 2002/0012063 A1 | 1/2002 | Kobayashi | |
| 2003/0184659 A1* | 10/2003 | Skow | 348/228.1 |
| 2005/0093996 A1* | 5/2005 | Kinoshita | 348/226.1 |
| 2005/0200744 A1* | 9/2005 | Kobayashi | H04N 5/23245 348/362 |
| 2005/0246143 A1 | 11/2005 | Han et al. | |
| 2008/0101721 A1* | 5/2008 | Mori | 382/275 |
| 2008/0309791 A1* | 12/2008 | Nishiwaki et al. | 348/226.1 |
| 2009/0219409 A1* | 9/2009 | Mikami | H04N 5/235 348/226.1 |
| 2010/0013954 A1* | 1/2010 | Fukugawa | H04N 5/23212 348/226.1 |
| 2010/0045819 A1* | 2/2010 | Pillman | H04N 5/2357 348/226.1 |

OTHER PUBLICATIONS

Great Britain Intellectual Property Office's Search Report corresponding to Application No. GB1021280.1, dated Mar. 31, 2011.

* cited by examiner

*Primary Examiner* — Aung S Moe
(74) *Attorney, Agent, or Firm* — Husch Blackwell LLP

(57) ABSTRACT

Systems and methods for reducing or substantially eliminating image flicker are provided. The method includes capturing a frame from a video data stream from a monitored region at a frame capture rate wherein the monitored region is illuminated by a lighting system with a predetermined cycle variation, determining a minimum common multiple of the frame capture rate and the cycle variation, determining a number of frames captured within the determined minimum common multiple of the frame capture rate and the cycle variation, and measuring accumulation at a multiple of the determined number of frames. Measuring the accumulation at a multiple of the determined number of frames substantially eliminates image flicker in the video data stream.

15 Claims, 5 Drawing Sheets

SYSTEMS AND METHODS FOR REDUCED IMAGE FLICKER

FIELD OF INVENTION

The present invention relates generally to video surveillance. More particularly, the present invention relates to systems and methods to reduce image flicker in video surveillance cameras.

BACKGROUND

Intelligent security has become a widespread and necessary reality of modern day civilization, and one aspect of known intelligent security is video surveillance. Video surveillance is an integral part of the technology used in modern day security systems.

Known security systems can include surveillance cameras or other data collection devices, video recorders or other data storage devices, and video viewers or monitors. For example, surveillance cameras can monitor a particular region, and video data streams from the cameras can be displayed and monitored by security personnel on video monitors. The video can be stored in associated video recorders.

When a monitored region is lit with artificial lighting, image flicker issues can arise. For example, many monitored regions are lit with fluorescent lamps having a frequency of approximately 50-60 Hz. When the region is captured by a surveillance video camera, flickers of frequency are often generated due to the relation between the field frequency and the lighting frequency of the lamp. Accordingly, systems and methods have been developed to reduce image flicker.

For example, many known surveillance video cameras use an n/100s shutter speed when the monitored area is lit with a 50 Hz lamp and use an n/120s shutter speed when the monitored region is lit with a 60 Hz lamp to reduce and/or eliminate the lamp's cyclical effect. Auto exposure (AE) measuring is determined by each pixel's y accumulation during each frame's exposure time.

FIG. 1A is a graph depicting lighting voltage versus time in a 50 Hz AC lighting system, and FIG. 1B is a graph depicting lighting luminance versus time in a 50 Hz AC lighting system. When a 50 Hz AC powered lamp is employed, the luminance y operates at a 100 Hz frequency. To avoid the periodic y variation effect, known systems and methods to reduce image flicker use an n/100s fixed exposure time, wherein n=1, 2, 3, 4 . . . . During the exposure time, each pixel's y accumulation will not vary between a different start point and end point. Accordingly, flicker issues can be substantially reduced and/or eliminated.

However, in known systems and methods to reduce image flicker, automatic gain control (AGC) steps are inserted between n/100s and (n+1)/100s to achieve the proper AE level. The AGC gain causes an increase in image noise and causes a decrease in image signal to noise (S/N) ratio. Further, when it is necessary to operate the shutter speed at less than 1/100s exposure time, known systems and methods have been unable to reduce bright scene flicker.

There is, thus, a continuing, ongoing need for improved systems and methods to reduce image flicker. Preferably, such improved systems and methods employ an AE statistic counter-measure.

DESCRIPTION OF THE PREFERRED EMBODIMENTS

Figure 1A:
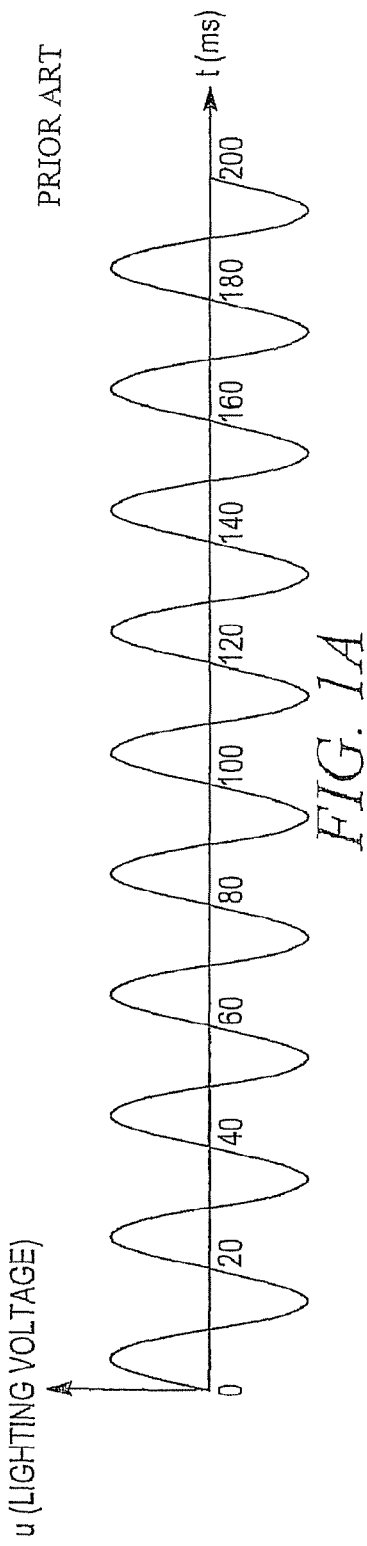
FIG. 1A is a graph that depicts lighting voltage versus time in a 50 Hz AC lighting system.
Figure 1B:
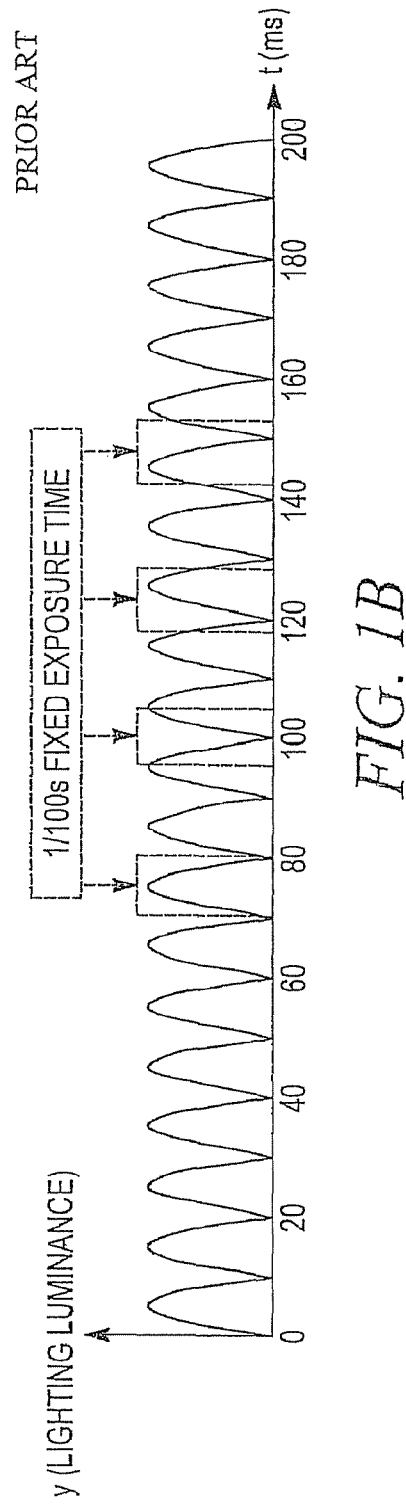
FIG. 1B is a graph that depicts lighting luminance versus time in a 50 Hz AC lighting system.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include improved systems and methods to reduce image flicker. Preferably, such improved systems and methods employ an AE statistic counter-measure.

In accordance with the present invention, the lamp luminance y of a lighting system operating at 50 Hz, for example, can perform a 10 ms cycle variation. In a 30 frames per second (fps) streaming camera system, the frame can be sent and captured every 100/3 ms. Image flicker can result because the start point of frame n−1 and the end point of frame n are random relative to the lamp's 10 ms cycle luminance.

Furthermore, the lighting luminance y is not the same for the AE measuring of every frame. Accordingly, AE adjusts the exposure time up or down after each frame. Thus, image flicker occurs.

Systems and methods of the present invention can perform an AE statistic counter-measure instead of using the y accumulation of one frame's pixels for AE measurement. To eliminate the lamp luminance 10 ms cycle variation, the minimum common multiple of a y variation cycle and captured frame period can be calculated. Then, the frame count, p, within each minimum common multiple can be calculated.

Multiples of the frame count, p, can be used to measure an AE level on a proper AE loop stability and hysteresis. That is, the accumulation of p×m frames can be used to measure an appropriate AE level, wherein m=1, 2, 3 . . . . When systems and methods in accordance with the present invention are employed, the calculated AE level will not be falsely defined by lamp luminance variation.

Figure 2A:
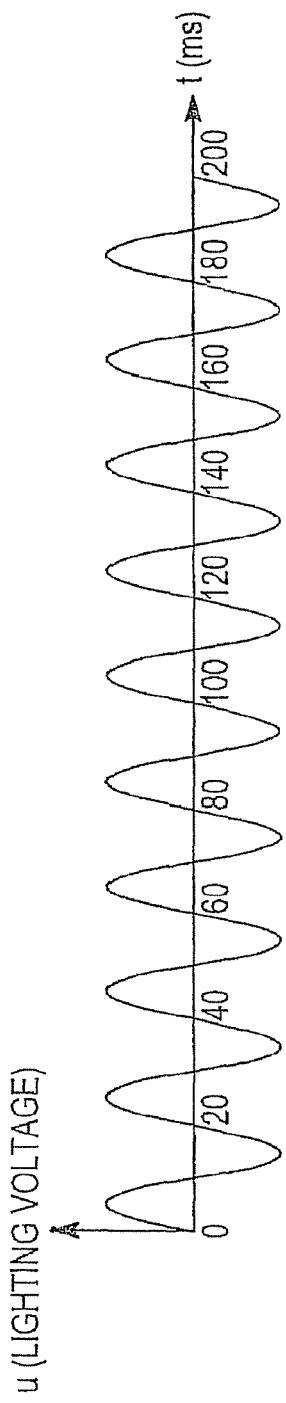
FIG. 2A is a graph that depicts lighting voltage versus time in accordance with the present invention.
Figure 2B:
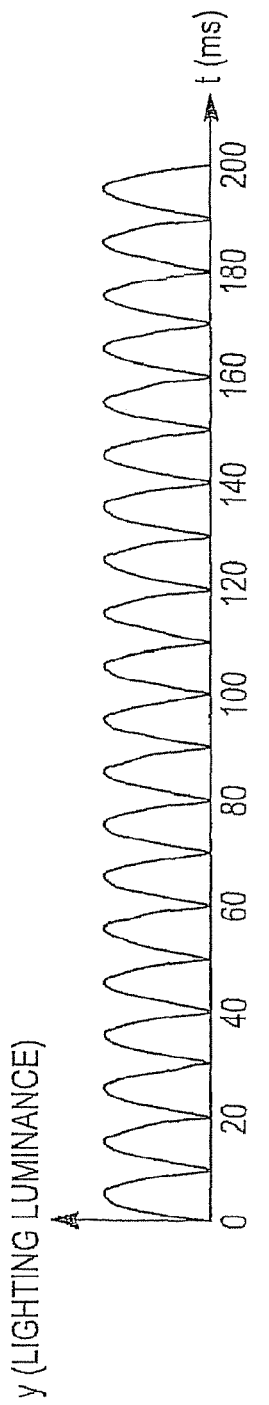
FIG. 2B is a graph that depicts lighting luminance versus time in accordance with the present invention.
Figure 2C:
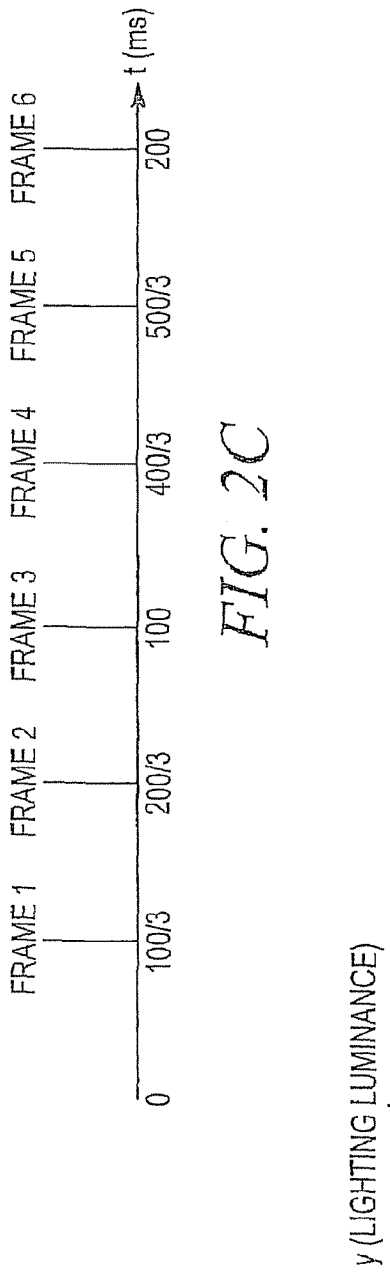
FIG. 2C is a graph that depicts frame capture versus time in accordance with the present invention.

FIG. 2A is a graph that depicts lighting voltage versus time in accordance with the present invention, and FIG. 2B is a graph that depicts lighting luminance versus time in accordance with the present invention. As seen in FIG. 2C, for example, a camera system can have a 100/3 ms frame period and a 10 ms lamp luminance variation cycle. The minimum common multiple of the frame period and lamp luminance cycle is, thus, 100 ms.

In 100 ms, 3 frames are captured. That is, p=3. Systems and methods in accordance with the present invention can then measure accumulation every 3×m frames, wherein m=1, 2, 3 . . . . Thus, image flicker can be reduced and/or substantially eliminated.

Figure 2D:
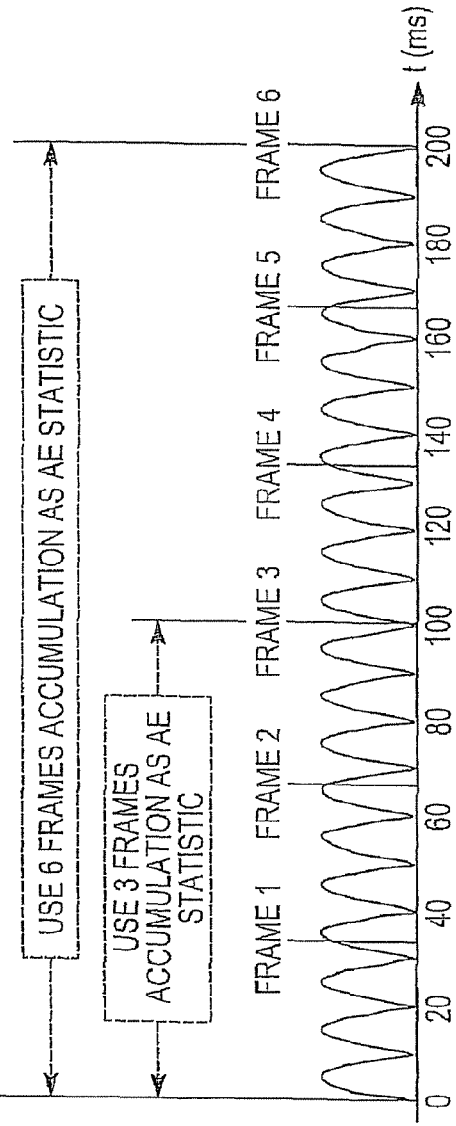
FIG. 2D is a graph that depicts lighting luminance and frame accumulation versus time in accordance with the present invention.

FIG. 2D is a graph that depicts lighting luminance and frame accumulation versus time in accordance with the present invention. As seen in FIG. 2D, for example, systems and methods of the present invention can measure accumulation every 3 frames (3×1 wherein m=1) or every 6 frames (3×2 wherein m=2). Systems and methods of the present invention can use any multiple of p as the AE statistic to measure frame accumulation.

Further, systems and methods in accordance with the present invention can use full auto exposure control (AEC) and AGC steps as would be known and used by systems and methods to reduce image flicker known in the art. However, in systems and methods in accordance with the present invention, an AGC gain step is only added when AEC reaches a maximum under a dark scene. Accordingly, the AGC gain step will not import extra noise and will not decrease the S/N ratio. In systems and methods of the present invention, AEG and AGC steps can be applied to a low light scene to optimize performance.

Systems and methods in accordance with the present invention can act in a full AE loop. Accordingly, systems and methods in accordance with the present invention do not encounter an invalidation issue when shutter speed is less than 1/100s.

When video surveillance cameras are employed, AE must remain stable when a person walks through the scene captured by a video camera or when some other transient variation occurs. Accordingly, systems and methods of the present invention are advantageous. For example, when a 45 frame accumulation (3×m=45 wherein m=9) is employed for AE measuring, the stability of an AE loop is enhanced, and better video performance is achieved.

Figure 3:
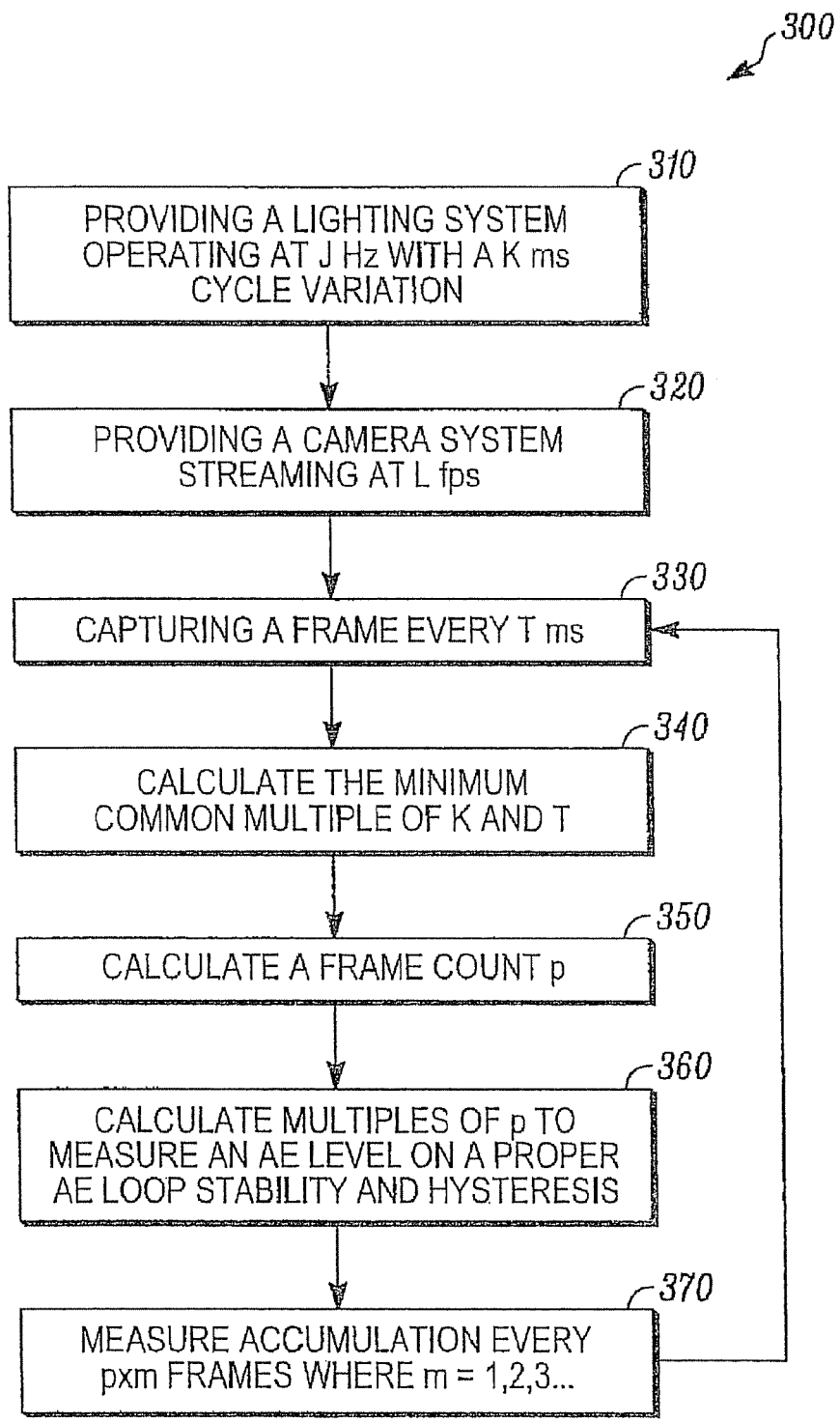
FIG. 3 is a flow diagram of a method in accordance with the present invention.

FIG. 3 is a flow diagram of a method 300 in accordance with the present invention. In the method 300, a lighting system can be provided operating at J Hz with a K ms cycle variation as in 310. A camera system streaming at L fps can be provided as in 320, and a frame can be captured every T ms as in 330.

The minimum common multiple of K and T can be calculated as in 340, and a frame count, p, can be calculated as in 350. Multiples of p can be calculated as in 360 to measure an AE level on a proper AE loop stability and hysteresis, and accumulation can be measured every p×m frames as in 370 wherein m=1, 2, 3, . . . . The method 300 can then continue capturing frames as in 330.

Figure 4:
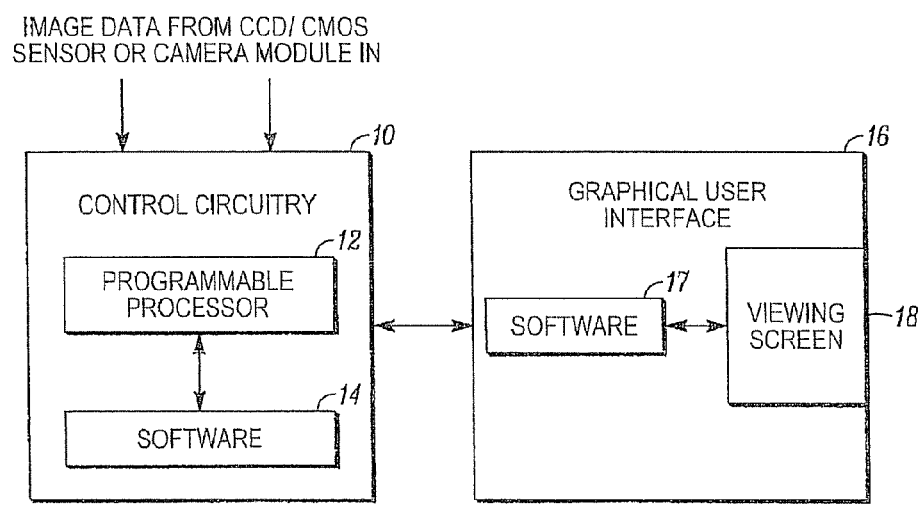
FIG. 4 is a block diagram of systems for carrying out the method of FIG. 3.

The method of FIG. 3 and others in accordance with the present invention can be implemented with a programmable processor and associated control circuitry. As seen in FIG. 4, control circuitry 10 can include a programmable processor 12 and associated software 14 stored on a local computer readable medium as would be understood by those of ordinary skill in the art. Real-time or pre-stored video data streams can be input into the programmable processor 12 and associated control circuitry 10.

Software 14, which can implement the exemplary method of FIG. 3, can be stored on a computer readable medium, for example, a disk or solid state memory, and be executed by the processor 12. The disk and associated software 14 can be removably coupled to the programmable processor 12. Alternatively, the software 14 can be downloaded to the medium via a computer network.

An associated graphical user interface 16 can be in communication with the processor 12 and associated circuitry 10. A viewing screen 18 of the user interface, as would be known by those of skill in the art, can display interactive and viewing windows. In embodiments of the present invention, the user interface 16 can be a multi-dimensional graphical user interface. The user interface 16 can display video data streams with reduced image flicker in accordance with the present invention.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A method comprising:
   capturing a frame from a video data stream of a monitored region at a frame capture rate, the monitored region illuminated by a lighting system with a predetermined cycle variation;
   determining a minimum common multiple of the frame capture rate and the predetermined cycle variation;
   determining a number of frames captured within the minimum common multiple of the frame capture rate and the predetermined cycle variation;
   measuring an accumulation of a multiple of the number of frames, wherein measuring the accumulation of the multiple of the number of frames substantially eliminates image flicker in the video data stream; and
   adjusting an exposure time of an automatic exposure control based upon the multiple of the number of frames.

2. The method as in claim 1 wherein the lighting system operates at approximately 50-60 Hz.

3. The method as in claim 1 wherein the frame capture rate is approximately 100/3 ms.

4. The method as in claim 3 wherein the predetermined cycle variation is approximately 10 ms.

5. The method as in claim 4 wherein the minimum common multiple of the frame capture rate and the predetermined cycle variation is approximately 100 ms.

6. The method as in claim 5 wherein the number of frames captured within every 100 ms is approximately 3.

7. The method as in claim 6 wherein the accumulation is measured every 3, 6, 9, 12, 15, 18, 21, 24, 27, 30, 33, 36, 39, 42, or 45 frames.

8. The method as in claim 1 further comprising maintaining a signal to noise ratio of the video data stream.

9. The method as in claim 1 further comprising adding AEC and AGC steps to optimize performance.

10. A system comprising:
    circuitry that captures a frame from a video data stream of a monitored region at a frame capture rate, the monitored region illuminated by a lighting system with a predetermined cycle variation;
    circuitry that determines a minimum common multiple of the frame capture rate and the predetermined cycle variation;
    circuitry that determines a number of frames captured within the minimum common multiple of the frame capture rate and the predetermined cycle variation;
    circuitry that measures an accumulation of a multiple of the number of frames, wherein the circuitry that measures the accumulation of the multiple of the number of frames substantially eliminates image flicker in the video data stream; and circuitry that adjusts an exposure time of an automatic exposure control based upon the multiple of the number of frames.

11. The system as in claim 10 further comprising circuitry that maintains a signal to noise ratio of the video data stream.

12. The system as in claim 10 further comprising circuitry that adds AEC and AGC steps to optimize performance.

13. The system as in claim 10 further comprising circuitry that displays the video data stream with the image flicker substantially eliminated.

14. An apparatus comprising:
  a programmable processor and associated control circuitry; and
  a user interface,
  wherein the programmable processor and the associated control circuitry receive video data streams from a monitored region illuminated by a lighting system with a predetermined cycle variation, capture frames from the video data streams at a frame capture rate, determine a minimum common multiple of the frame capture rate and the predetermined cycle variation, determine a number of frames captured within the minimum common multiple of the frame capture rate and the predetermined cycle variation, measure an accumulation of a multiple of the number of frames, and adjust an exposure time of an automatic exposure control based upon the multiple of the number of frames.

15. The apparatus as in claim 14 wherein the user interface displays the video data streams with substantially eliminated image flicker.

\* \* \* \* \*